Patented Feb. 5, 1952

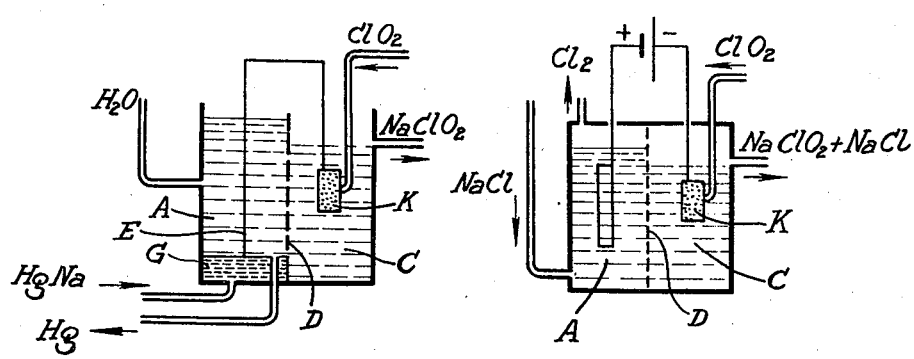
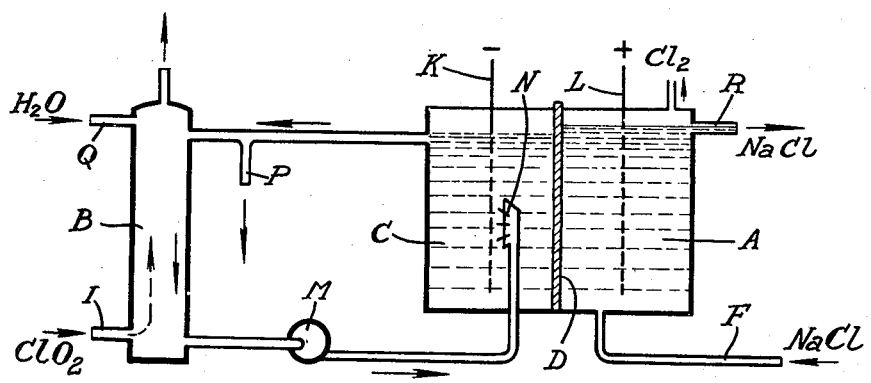

2,584,824

UNITED STATES PATENT OFFICE 2,584,824

ELECTROLYTIC PREPARATION OF ALKALI METAL CHLORITES

Lambert Vanharen, Ixelles-Brussels, Michel Rossier, Uccle-Brussels, and Louis Vandeur, Watermael-Brussels, Belgium, assignors to Solvay & Cie, Ixelles-Brussels, Belgium, a Belgian company Application February 18, 1948, Serial No. 9,096
In Belgium July 19, 1946

Section 1, Public Law 690, August 8, 1946
Patent expires July 19, 1966

5 Claims. (Cl. 204—95)

The present invention relates to the production of soluble chlorites from chlorine dioxide and an alkali metal hydroxide.

It is known that by causing chlorine dioxide to react with an alkali hydroxide such as caustic soda, there are produced equimolecular quantities of alkali chlorite and chlorate so that the theoretical yield from $ClO_2$ in chlorite cannot exceed 50%.

In order to avoid this loss and to attain a theoretically complete conversion of $ClO_2$ into chlorite, it has been proposed to operate in the presence of reducing agents such as sulphur, carbonaceous materials, or suitably selected metal oxides or hydroxides.

These processes necessarily entail the presence of foreign substances in the reaction mixture and consequently the introduction of these substances is likely to give rise to the presence of impurities in the solid final product. Moreover a common drawback of such reducing agents is that they cause the direct conversion of a not inconsiderable amount of chlorine dioxide into chlorides; neither do they entirely prevent the formation of chlorates.

The object of our invention is to overcome these inconveniences and to prepare alkali chlorites by absorption of chlorine dioxide under conditions which practically exclude the presence of chlorate and chloride in the solution. To that end we use a reducing process which, so far as we are aware, has not yet been suggested in connection with the production of chlorites. This process is based on cathodic reduction and it consists in causing such reduction to take place in contact with a cathodically polarised electrode by bringing the chlorine dioxide into the closest possible contact with that electrode.

We have found that the conditions necessary for carrying out our improved process are as follows:

(1) In order to obtain a satisfactory yield of the electrolytic reduction it is indispensable that the amount of $ClO_2$ supplied to the cathode for a given time be at least stoichiometrically equal to the amount of nascent hydrogen evolved during the same time. Furthermore, in order to avoid that the reduction by nascent hydrogen evolved at the cathode might act on the chlorite formed and might convert it into chloride, instead of acting exclusively on the dissolved dioxide we provide a large excess of $ClO_2$ relatively to the nascent hydrogen. As $ClO_2$ is much more adapted to react than the chlorite, the reduction of the latter is practically avoided.

(2) The liquid into which the chlorine dioxide is introduced must be slightly acid to nearly neutral, that is to say at a pH comprised between 4 and 9. Moreover, in view of the well-known lack of stability of chlorine dioxide and chlorites at elevated temperature, the decomposition of $ClO_2$ and of the chlorite formed will be avoided by operating at moderate temperature.

The process in accordance with our invention may be carried out in any electrolytic apparatus adapted to give off hydrogen at the cathode. Apparatus of this kind are illustrated by way of example in the accompanying drawing in which:

Fig. 1 shows an apparatus for the decomposition of alkali amalgam and the use of the alkali ion for forming the chlorite.

Fig. 2 shows a cell suitable for the electrolysis of saline solutions.

Fig. 3 shows a cell with an external circuit for the circulation of the catholyte between the cell and a saturator supplied with chlorine dioxide.

Referring to Fig. 1, we use a receptacle which is preferably, though not necessarily provided with a filtering diaphragm D. Into the anode compartment A we introduce alkali amalgam G and water, and into the cathode compartment C we feed chlorine dioxide through a porous plug K of conducting material such as graphite or stacked metal gauze. The anode G and cathode K being connected by an electric conductor, there is generated an electric current which decomposes the amalgam at the anode and gives rise to cathodic reduction at the plug K.

In another embodiment of the invention we operate in an electrolytic cell as illustrated in Fig. 2 so as to fulfill the conditions set forth above. Into the anode compartment A we introduce a solution of alkali chloride in order to liberate chlorine at the anode. Chlorine dioxide is fed into the cathode compartment C through a porous plug K of graphite for example. The alkali chlorite solution practically free from chlorate is withdrawn by overflow from the compartment C. We are aware that the use of a porous electrode is well known (cf. Ind. Eng. Chemistry, 1925, vol. 17, p. 826) and we do not claim the use of such a device per se but only in a process answering the conditions hereinabove pointed out.

In a further embodiment of our invention, illustrated in Fig. 3, we operate in an electrolytic cell comprising a cathode compartment C and an anode compartment A separated by a diaphragm D. Through a diffusor N we feed into C a solution containing chlorite, in which $ClO_2$ has been dissolved previous to its entrance into the cell, for example in a tower B supplied with water at Q and with ClO₂ at I. A pump M conveys the solution to the cathode K in the cell. The anode compartment is supplied with a solution of alkali chloride at F and the exhausted chloride solution is evacuated through the overflow R. Fresh amounts of alkali chlorite are formed in the cathode compartment and a portion of the concentrated solution in C is taken off through P while the other portion returns to the tower B where it has water added to it and absorbs further quantities of ClO₂.

The actual sequence of operations, in the process according to the invention is difficult to check so that the following statements are only given by way of explanation, in order that the invention may be more easily understood.

It seems that the nascent hydrogen given off at the cathode reacts with the chlorine dioxide in order to form chlorous acid which, in turn, appears to react with the alkali as follows:

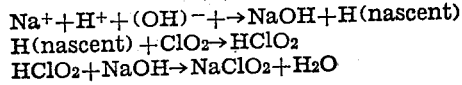

It has been suggested that the chlorine dioxide reacts with water in order to give equimolecular quantities of chloric acid and chlorous acid, which acids react with the alkali to form chlorate and chlorite, whereupon the chlorate is reduced by the nascent hydrogen. This however is not verified, since it is known that the reduction of chlorate by nascent hydrogen leads to the formation of chloride, whereas it is found that in our process no chloride is formed and practically the whole of the ClO₂ introduced gives rise to the production of chlorite.

It is also known that when a large excess of chlorous acid is caused to react on an alkaline base, there is formed almost exclusively chlorite. Now the difficulty heretofore lay in converting ClO₂ into chlorous acid without forming chloric acid.

When carrying out our improved process it is found that, contrary to what was to be expected in the light of previous knowledge, all happens as if no chloric acid or chlorates were formed, or if these compounds should have formed, these are reduced to the state of chlorites and not chlorides.

The last described method of carrying out our invention seems to show that the ions of alkali metal discharged at the cathode react with water to form alkali hydroxide and nascent hydrogen, and that the latter reduces the chlorine dioxide in presence of alkali hydroxide to form directly chlorite without producing any chlorate or chloride. It should however be understood that this is a mere hypothesis given by way of explanation and that other explanations might be possible.

It follows that the introduction of ClO₂ must take place in close proximity to the cathode, that is to say either through the cathode itself or so as to bring the dissolved ClO₂ in contact with the cathode. The hypothesis above referred to also shows that the amount of ClO₂ in contact with the cathode should be greater than the amount that can be reduced by the hydrogen liberated at the cathode.

We have observed that at the cathode a small portion of the nascent hydrogen does not partake in the reaction. This results in the solution becoming gradually more alkaline. Since the reaction between ClO₂ and an alkaline hydroxide, as is well known, gives rise to the production of equivalent quantities of alkaline chlorite and chlorate, it is necessary to prevent the small quantities of unreacted hydroxide from being partly converted into chlorate. To that end the production of undue alkalinity can be prevented by neutralisation, for example by means of added hydrochloric acid. We however prefer to compensate for the inactivity of the small quantities of hydrogen as stated above by adding, in a manner known "per se," hydrogen peroxide in amounts proportional to the quantities of unreacted hydrogen.

The addition of hydrogen peroxide has the advantage, in this particular case, of making it possible to use for the production of alkali chlorite the whole of the alkali hydroxide obtained electrolytically and thus to use to best advantage the electrolytic current.

We claim:

1. The process of preparing an alkali metal chlorite, which comprises subjecting to electrolysis as a catholyte in a diaphragmed electrolytic cell an aqueous solution comprising an alkali metal hydroxide, simultaneously introducing chlorine dioxide into direct contact with the polarized cathode in a quantity stoichiometrically in excess of the hydrogen discharged at the cathode, while maintaining the catholyte slightly acid to nearly neutral, thereby obtaining the chlorite.

2. The process of preparing an alkali metal chlorite, which comprises providing an aqueous solution of an alkali metal hydroxide in the cathode compartment of a diaphragmed electrolytic cell, simultaneously subjecting chlorine dioxide to electrolytic reduction by introducing said chlorine dioxide into contact with the polarized cathode in a quantity stoichiometrically in excess of the hydrogen discharged at the cathode, while maintaining the catholyte slightly acid to nearly neutral, thereby obtaining the chlorite.

3. The process of preparing an alkali metal chlorite, which comprises subjecting an aqueous solution of alkali metal chloride to electrolysis in a diaphragmed electrolyte cell, thereby forming alkali metal hydroxide at the cathode, simultaneously introducing chlorine dioxide into direct contact with the polarized cathode, thereby subjecting said chlorine dioxide to cathodic reduction, said chlorine dioxide being introduced in a quantity stoichiometrically in excess of the hydrogen discharged at the cathode, while maintaining the catholyte slightly acid to nearly neutral, thereby obtaining the chlorite.

4. In the process as defined in claim 2, adding small quantities of hydrogen peroxide to said solution.

5. In the process as defined in claim 3, introducing alkali chloride into the anode compartment of said cell, circulating the catholyte from the cathode compartment of said cell to a dissolution chamber and back to said cathode compartment in close proximity to the cathode, the chlorine dioxide being introduced in said dissolution chamber, thereby obtaining the alkali metal chlorite by reaction between the chlorine dioxide, nascent hydrogen and alkali metal hydroxide formed at the cathode, withdrawing a portion of the chlorite containing solution, and circulating the remainder of the solution.

LAMBERT VANHAREN.
MICHEL ROSSIER.
LOUIS VANDEUR.

(References on following page)

REFERENCES CITED

The following references are of record in the file of this patent:

UNITED STATES PATENTS

| Number | Name | Date |
|---|---|---|
| 809,089 | Blackmore | Jan. 2, 1906 |
| 2,169,066 | Cunningham | Aug. 8, 1939 |
| 2,273,795 | Heise et al. | Feb. 17, 1942 |

OTHER REFERENCES

Mellor: Inorganic and Theoretical Chemistry, vol. II (1927), pp. 283, 289, 320.

Gilman: Inorganic Reactions (1929), p. 106.

Weiss: Transactions Faraday Society, vol. 43 (1947), pp. 173–177.

Holst: Chemical Abstracts, vol. 39 (1945), p. 3194.